May 10, 1960

V. R. ABRAMS 2,935,930

APPARATUS FOR PROCESSING FOODS

Filed April 19, 1955

INVENTOR.
Victor R. Abrams
By: Olson & Trexler
attys.

May 10, 1960 V. R. ABRAMS 2,935,930
APPARATUS FOR PROCESSING FOODS
Filed April 19, 1955 7 Sheets-Sheet 5

INVENTOR.
Victor R. Abrams
BY:
Olson & Trexler
attys.

United States Patent Office 2,935,930
Patented May 10, 1960

2,935,930

APPARATUS FOR PROCESSING FOODS

Victor R. Abrams, Rockford, Ill., assignor to W. F. and John Barnes Company, Rockford, Ill., a corporation of Illinois Application April 19, 1955, Serial No. 502,489

13 Claims. (Cl. 99—356)

The present invention relates to a novel apparatus for processing particles of solid materials and more particularly, to a novel apparatus for processing particles of foods such as diced beets, whole corn, peas, beans, diced meat and similar food products.

When sterilizing or similarly processing food products of the above described type, it is important to prevent crushing or mashing of the food product in order to avoid loss of its juices and to maintain its appetizing appearance. Therefore, such foods have generally been sterilized or cooked in batches or after they have been placed in cans or similar containers, but such prior methods of processing the food have not always been satisfactory since they are relatively slow and, therefore, uneconomical and since food particles in the center portion of the batch or can may be underheated while food particles in the outer portion of the batch or can may be overcooked and damaged.

It is an important object of the present invention to provide a novel apparatus for continuously sterilizing or similarly processing food products of the above described type in a relatively rapid and, therefore, economical manner.

Another object of the present invention is to provide a novel apparatus for continuously sterilizing or similarly processing food products of the above described type in a manner so that all particles of the food product are substantially uniformly processed whereby to insure sterilization of all the particles without danger of overcooking a portion of the food particles.

Another important object of the present invention is to provide a novel apparatus for substantially continuously sterilizing food products of the above described type without crushing or mashing the particles of the food product.

Another object of the present invention is to provide a novel unitary apparatus for not only sterilizing or similarly processing food products of the above described type but also for dispensing the processed food product into cans or other suitable containers.

Another object of the present invention is to provide a novel apparatus wherein food products of the above described type may be heated to a sterilizing or processing temperature and held at this temperature for a predetermined period of time and then cooled so as to avoid overcooking.

Other and more specific objects of the present invention will become apparent from the following description and the accompanying drawings wherein.

Figures 1, 2:
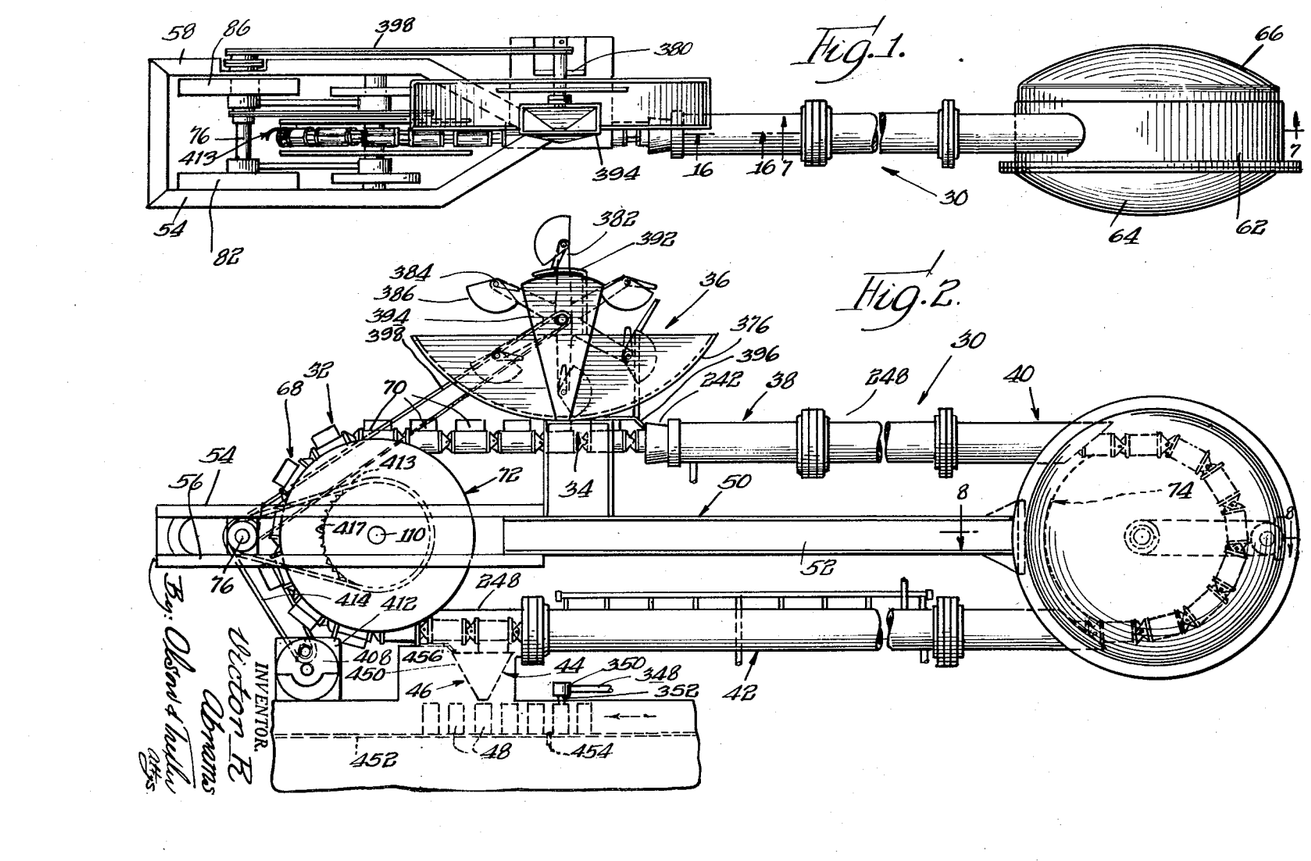
Fig. 1 is a plan view, with certain elements omitted for clearness, of an apparatus embodying the principles of the present invention.
Fig. 2 is a side elevational view of the apparatus shown in Fig. 1.

Referring now more specifically to the drawings wherein like parts are designated by the same numerals throughout the various figures, an apparatus 30 embodying the principles of the present invention is shown in Figs. 1 and 2 and includes means 32 for conveying the food product to be processed from a conveyor filling station 34 adjacent which is disposed a filling mechanism 36 past processing portions 38, 40 and 42 of the apparatus to a discharge station 44. In the apparatus shown for the purpose of illustrating the present invention, the processing portions 38, 40 and 42 may respectively be designated as a purging and blanching portion wherein air is driven from the food product, a sterilizing portion, and a cooling portion. Also, in accordance with the features of the present invention, means 46 is provided at the discharge station 44 for arranging suitable containers such as cans and the like 48 in a predetermined manner and directing the processed food product into the containers.

The conveyor 32 is supported on generally horizontally disposed frame means 50, which frame means is provided, in part, by an elongated I-beam 52 or the like. Secured to and extending from one end of the I-beam are pairs of upper and lower frame members 54, 56, 58 and 60, which frame members are secured in position by other transversely extending and vertically extending frame members. The opposite end of the I-beam is welded or otherwise secured to the periphery of an annular member 62 which not only forms a part of the frame means but also forms a part of the housing which is completed by generally dish-shaped members 64 and 66 which close and seal opposite ends of the annular member 62.

The conveyor 32 includes an endless chain 68 provided by a plurality of pivotally connected container forming links 70, which endless chain encircles a pair of sprocket wheels 72 and 74. For a purpose to be set forth fully hereinbelow the sprocket wheels are mounted on the frame means in the following manner. A drive shaft 76 is journalled in bearing blocks 78 and 80 as shown best in Figs. 1, 3 and 4. The bearing block 78 is slidably mounted between a pair of elongated guide members 82 and 84 which are respectively fixed to the frame members 54 and 56, and the bearing block 80 is similarly slidably mounted between a pair of guide members 86 and 88 which are respectively fixed to the frame members 58 and 60. Elongated threaded rods 90 and 92 are respectively fixed to the bearing blocks 78 and 80 and extend through suitable openings in vertically disposed plate members 94 and 96 fixed to the frame means. Compression springs 98 and 100 are disposed on these rods between the bearing blocks and the plate members for resiliently biasing the bearing blocks and thus the shaft 76 toward the left as viewed in the drawings. Nut members 102 and 104 are threaded on the rods 90 and 92, respectively, for engagement with the plate members and limiting the movement of the shaft 76 toward the left. As will become apparent, this structure serves to maintain the endless chain 68 under the proper tension.

The sprocket wheel 72 is provided by a pair of disks 106 and 108 which are keyed or otherwise fixed to a shaft 110. The shaft is journalled in a pair of bearing members 112 and 114, which bearing members are respectively welded or otherwise fixed to lever arms 116 and 118, respectively. The opposite ends of the lever arm are respectively fixed to bearing members 120 and 122 which are rotatably mounted on the shaft 76 whereby the shaft 110 is supported for hinged movement about the shaft 76. Keyed or otherwise fixed to opposite ends of the shaft 110 are cam plates 124 and 126 having internal cam surfaces, each of which surfaces has a plurality of circumferentially spaced lobes 128 as shown best in Fig. 5. A roller 130 is journalled in a bearing block 132 fixed to the frame means for engagement with the cam surface of the disk 124 and a similar axially aligned roller 134 is journalled in a bearing block 136 mounted on the frame means for engagement with the cam surface of the disk 126. Thus, it is seen that the rollers 130 and 134 support the sprocket wheel shaft 110 through the cams so that as the shaft rotates it is raised and lowered by the cams. It should be noted that each of the cams 124 and 126 has a number of lobes 128 which is identical to the number of notches 138 spaced about the periphery of each of the sprocket wheel disks 106 and 108. While the number of cam lobes and notches may be varied, it is important that an odd number of cam lobes and notches be used for the purpose set forth hereinbelow. In the particular apparatus shown to illustrate the present invention, the cams have been provided with thirteen lobes and the sprocket wheel disks have been provided with thirteen notches. Preferably, the notches 138 are formed in blocks 140 which are secured about the peripheries of the disks 106 and 108 by screws or other suitable means so that they may be removed and replaced when worn or for any other desired purpose.

The sprocket wheel 74 is also mounted for up-and-down movement in much the same manner as the sprocket wheel 72. More specifically, the sprocket wheel 74 includes a pair of disks 142 and 144 each having an odd number of notches spaced around its periphery, which notches are also preferably provided by a plurality of blocks 140. The disks 142 and 144 are welded or otherwise secured to a hub 146 that is keyed or otherwise fixed on a shaft 148. The shaft 148 is journalled in bearing members 150 and 152, which bearing members are respectively welded to ends of lever arms 154 and 156. The opposite ends of the lever arms are respectively welded to bearing members 158 and 160, which bearing members are rotatably disposed on the shaft 162. The shaft 162 is mounted on the wall of the frame and housing member 62 by a bracket 164. Fixed on opposite ends of the shaft 148 are annular cam members 166 and 168 which are substantially identical to the above described cam members 124 and 126. A bracket member 169 carrying a roller 170 for cooperation with the cam 166 is mounted on the end cover 64 and a similar bracket member 172 carrying a roller 174 for cooperation with the cam 168 is mounted on the end cover 66.

Figure 16:
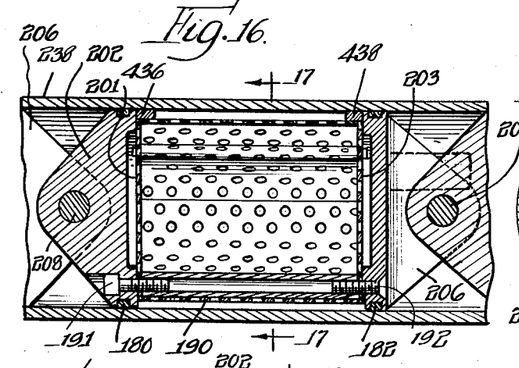
Fig. 16 is an enlarged fragmentary sectional view taken along line 16—16 in Fig. 1.
Figure 17:
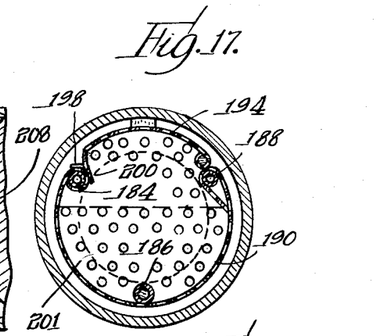
Fig. 17 is a cross sectional view taken along line 17—17 in Fig. 16.
Figure 18:
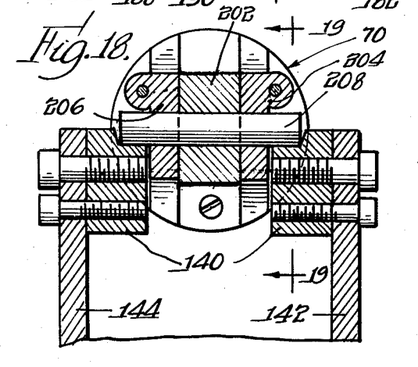
Fig. 18 is an enlarged fragmentary cross sectional view taken along line 18—18 in Fig. 7.
Figure 19:
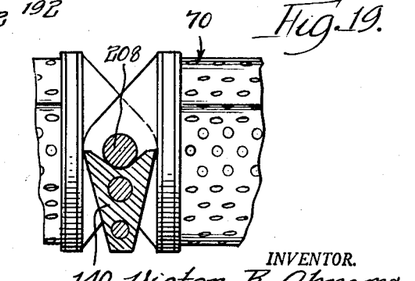
Fig. 19 is a cross sectional view taken along line 19—19 in Fig. 18.

The container-like links 70 of the endless conveyor 68 are shown best in Figs. 14 through 19. By referring to these figures, it is seen that each of the links includes a pair of piston-like end plates 176 and 178 which are respectively provided with O-rings or snap rings 180 and 182 in peripheral grooves for a purpose to be set forth below. A plurality of spacing and connecting rods 184, 186 and 188 extend between the piston-like end plates. Opposite ends of the rods are secured to the end plates by screws 191 and 192. In order to form a container between the end plates for the food product or the material to be processed, a semicylindrical perforated sheet 190 is disposed between the end plates and is connected to the rods 184 and 188 as shown best in Figs. 17. The container is provided with a hinged perforated sheet material cover 194. The cover 194 is hingedly mounted by means of a rod 196 extending between and fixed within suitable recesses in the end plates 176 and 178. The free margin of the cover is provided with finger and marginal portions 198 and 200 which are adapted to straddle the rod 184 when the cover is closed as shown in Fig. 17 positively to locate the cover in a predetermined manner. Preferably, the piston-like end plates are recessed as shown in Fig. 16 and perforated sheet metal and members 201 and 203 are joined with opposite ends of the semicylindrical body 190 to complete the container and maintain the food product out of contact with the heavy end plates. This is done since the heavy end plates absorb and retain more heat than the thin sheet material of the container which might injure the food if the food were in direct contact with the end plates. The piston-like plate member 176 is provided with a centrally located integral ear 202 which is adapted to extend between a pair of generally similar spaced ears 204 and 206 of the piston-like plate member 178 of an adjacent link. These ears are provided with aligned apertures adapted to receive a pin 208 for connecting adjacent links together.

As shown in Figs. 1 through 3 and 7, the blanching and sterilizing portions 38 and 40 of the apparatus include a plurality of tubes 210, 212 and 214. The tube 214 extends into an aperture in the annular housing member 62 and is welded to the periphery of the aperture as at 216. An annular flange 218 is secured to the free end of the tube 214, which flange mates with a similar flange 220 secured to the tube 212. The flanges are drawn tightly together by a plurality of bolts 222 and an O-ring 224 or the like is provided between the flanges so that the junction between the tubes 212 and 214 is sealed. A flange 226 is welded to the other end of the tube 212 and a flange 228 is welded to the adjacent end of the tube 210. These flanges are also secured together by a plurality of bolts 230. At this junction an annular member 232 is disposed between the flanges and projects radially inwardly of the tube. The junction is sealed by O-rings or the like 234 and 236, respectively, disposed between the flange 226 and annular member 232 and the annular member 232 and flange 228. The annular member 232 serves to locate a cylinder 238 which is welded thereto and which is disposed within the tube 210. A cap member 240 having a funnel-like portion 242 is secured to the free end of the tube 210.

Figure 3:
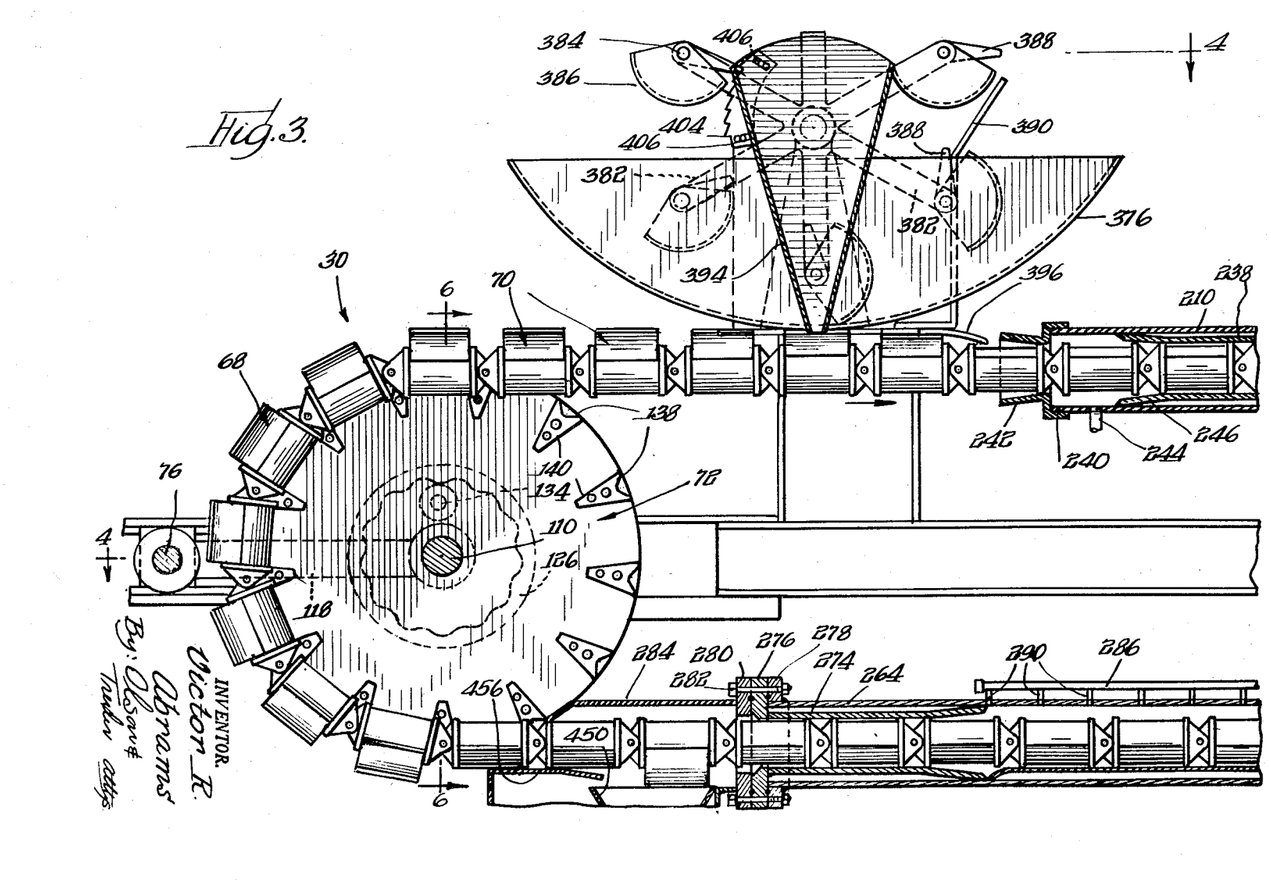
Fig. 3 is an enlarged fragmentary side elevational view partially sectioned to show certain elements of the apparatus in greater detail.
Figures 4, 5, 6:
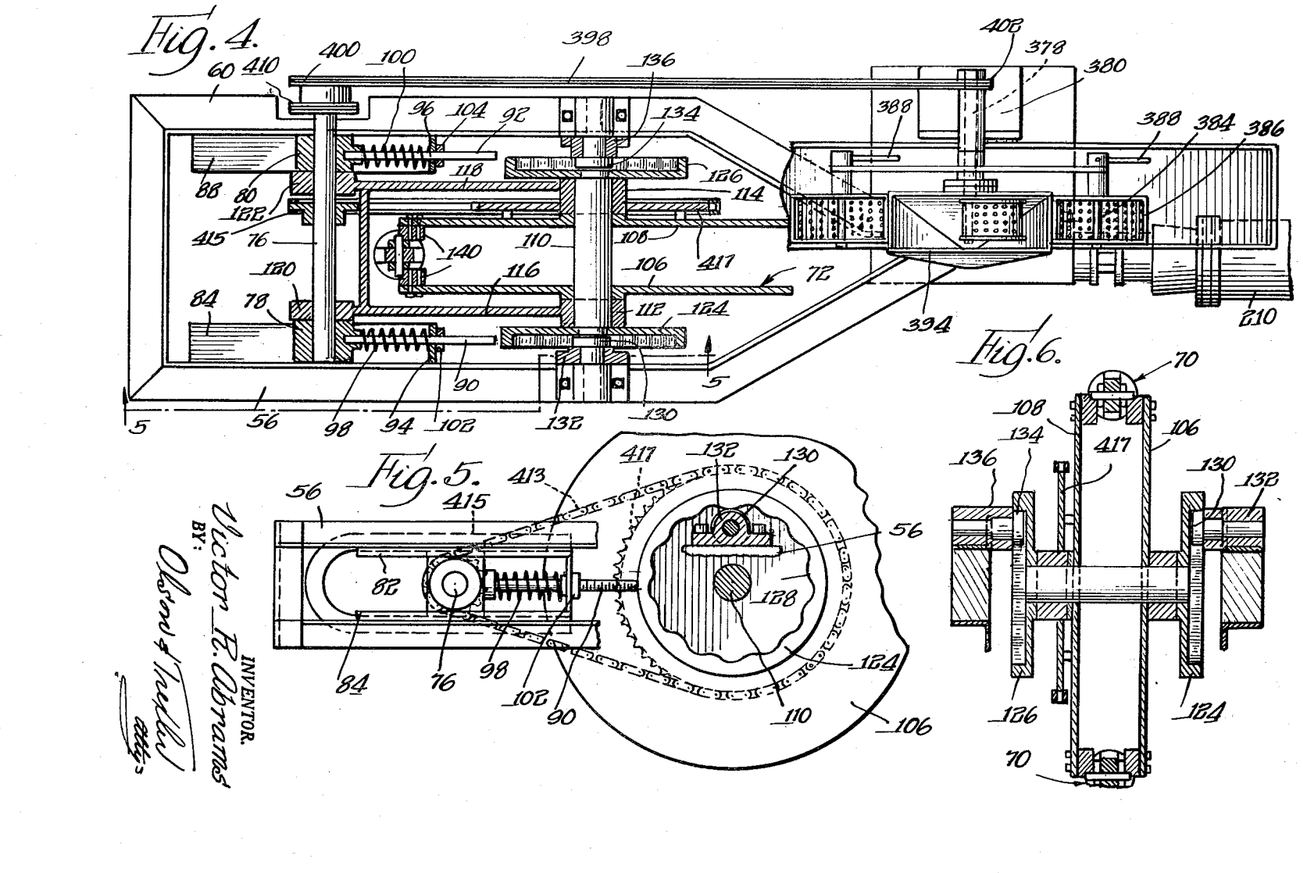
Fig. 4 is a cross-sectional view taken along line 4—4 in Fig. 3.
Fig. 5 is a fragmentary sectional view taken along line 5—5 in Fig. 4.
Fig. 6 is a cross sectional view taken along line 6—6 in Fig. 3.

Upon operation of the conveyor in the direction indicated by the arrows, the container-like links successively pass through the funnel 242 into the blanching and purging chamber provided by the tube 210. Steam is introduced into the chamber through one or more jets 244, which steam serves to blanch the material being processed and to drive any air from the chamber. Upon continued movement of the container-like links, the cylinder 238 is entered through an enlarged mouth 246 thereof. It should be noted that the internal diameter of the cylinder 238 is substantially the same as the diameter of the piston-like end plates of the links so that the rings 180 and 182 on the end plates engage the wall of the tube as shown in Figs. 3 and 16. Thus the cylinder 238 in combination with the piston-like end plates of the links provides a seal separating the blanching and purging chamber from the sterilizing portion of the apparatus. It will be appreciated that this seal is maintained continously since the length of the cylinder 238 is such that at least one of the link end plates is always disposed therein. As the links pass through the seal into the chamber provided by the tube 212, the material being processed is subjected to the action of steam introduced through a conduit 248.

The material being processed is raised to and held at the desired temperature by the steam while it passes through the tubes 212 and 214 and around the chamber surrounding the sprocket wheel 74. The steam, of course, fills the tubes and this chamber and may pass out of the chamber through an outlet conduit 250 having a throttle valve 252 therein. In order to separate the cooling section of the apparatus from the sterilizing section, a seal structure 254 is provided through which the container-like links pass as they leave the chamber surrounding the sprocket wheel 74.

The seal structure 254 includes a tube 256 which extends through an aperture in the annular housing member 62 and is welded to the periphery of the aperture as at 258. A flange 260 is welded to the outer end of the tube 256 for cooperation with a flange 262 welded to one end of a tube 264 forming an elongated chamber for the cooling section of the apparatus. Between these flanges which are drawn together by a plurality of bolts 266 is disposed an annular member 268 which projects radially within the tube. A sealing cylinder 270 adapted to cooperate with the piston-like end plates of the links is disposed within the tube 256 and is welded to the annular member 268. Preferably, the cylinder 270 is provided with an enlarged or flaring mouth 272 to facilitate the entry of the container-like links therein.

As mentioned above, the cooling section 42 of the apparatus includes an elongated chamber or passageway formed by the tube 264. The outlet end of this passageway is also provided with a seal structure which is shown best in Fig. 3. More specifically, a sealing cylinder 274 is disposed within an outlet end portion of the tube 264 and is welded to an annular member 276. A flange 278 is welded to the tube 264 and cooperates with a ring 280 and a plurality of bolts 282 for clamping the annular member 276 in place. The discharge station 44 of the apparatus is enclosed within housing means 284 for the purpose set forth more fully below, which housing means is welded to the ring 280 whereby the junction between the cooling section of the apparatus and the housing means is sealed against the entrance of the outside atmosphere which would contaminate the processed food.

In order to introduce a cooling liquid such as water into the tube 264, a manifold 286 is provided which is connected to a supply conduit 288. The manifold is also connected to a series of nozzles 290 which communicate with the interior of the tube 264. The water or other cooling liquid is withdrawn from the tube 264 through an outlet conduit 292. As will be appreciated, steam carried with the food or material being processed into the cooling chamber will condense so that there is a tendency for a vacuum to be created within the cooling chamber. In order to eliminate any possibility of the contaminating outside atmosphere being drawn into the tube 264, a sterile gas under pressure is directed into the tube through a conduit 294. Another important purpose for maintaining the sterile gas under pressure within the tube 264 is to prevent the steam carried by the food into the cooling chamber from expanding and exploding the food particles.

Figure 7:
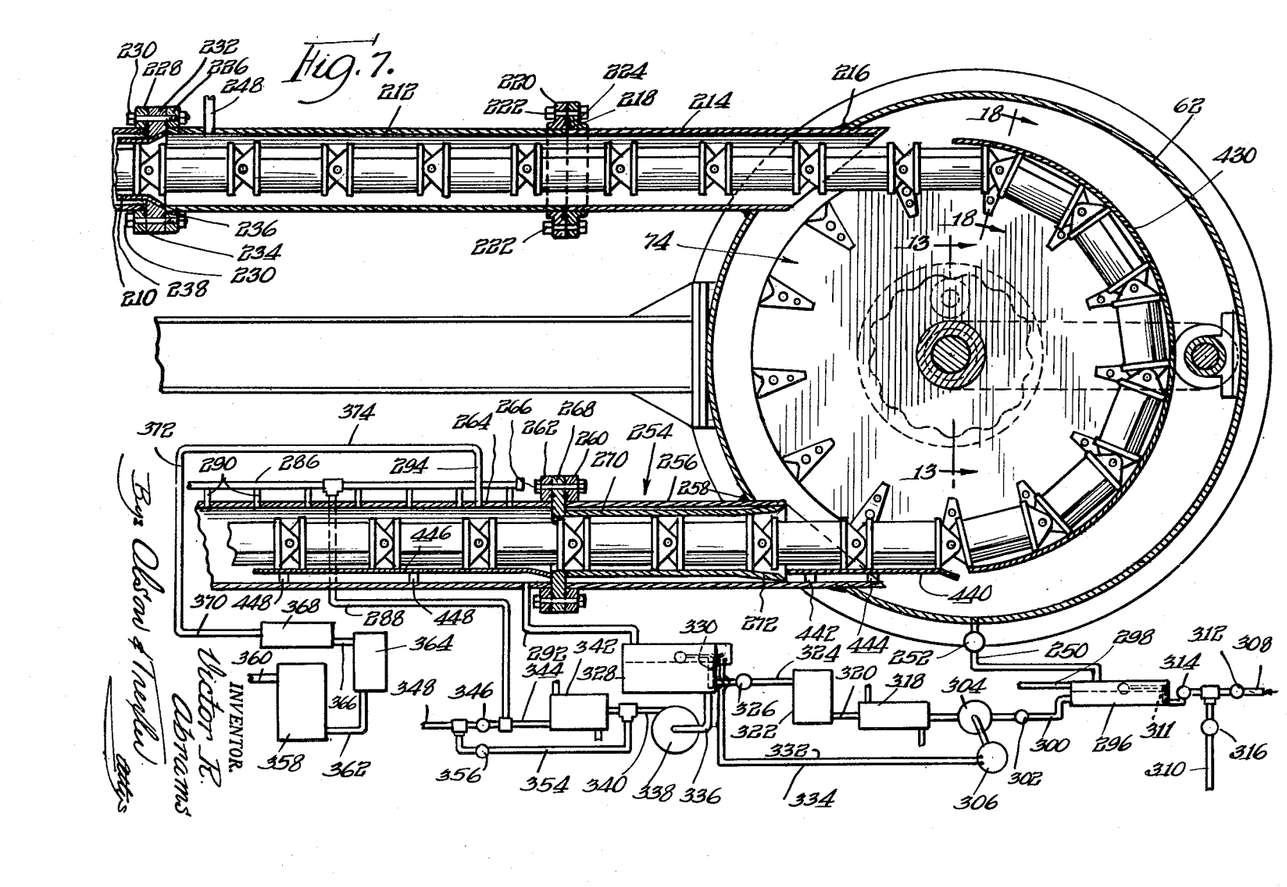
Fig. 7 is an enlarged fragmentary sectional view taken along line 7—7 in Fig. 1 and also schematically showing certain elements of the heating and cooling systems of the apparatus.

The apparatus for supplying the various processing fluids to the processing chambers is schematically shown in Figs. 3 and 7. More specifically, steam is supplied to the system from any suitable source, not shown, through the conduit 248. It is understood that the temperature and pressure of the steam may vary in accordance with the goods or food being processed but preferably, the steam supplied is saturated steam at pressures ranging from about 40 pounds per square inch to 150 pounds per square inch. Saturated steam is preferred since heat transfers therefrom to the goods being processed at a much higher rate than if the steam were superheated. It is important to note that the temperature of the saturated steam may be raised to the desired processing temperature, such for example, as 300° Fahrenheit since the continuous sealing of the opposite ends of the steam chamber permits the pressure of the steam within the steam chamber to be maintained considerably above atmospheric pressure. Thus, saturated or wet steam at any desired temperature and pressure may be continuously maintained in the steam chamber.

Steam entering the steam chamber through the conduit 248 passes through the tubes 212 and 214 into the housing surrounding the sprocket wheel 74 and condensate and steam is discharged through the conduit 250 and throttle or bleed valve 252. The conduit 250 directs the condensate and steam into a hot well 296 wherein a portion of the condensed water collects. Steam passes from the hot well through a conduit 298 which is connected to the conduit or nozzle 244 opening into the purging chamber provided by the tube 210. The condensate in the hot well 296 is drawn therefrom through a conduit 300 having a shutoff valve 302 therein by a pump 304 which is driven by a motor 306. This condensate is subsequently cooled and directed into the cooling chamber in the manner to be described below and since a portion thereof may be lost from the cooling chamber, make-up water is supplied to the system through a conduit 308. The conduit 308 is conveniently connected with the hot well and also with a drain conduit 310. Shutoff valves 312 and 314 are provided in the conduit 308 and a shutoff valve 316 is provided in the drain conduit 310. These valves may be selectively opened and closed so that the hot well is completely shut off from the conduit 308 or so that either make-up fluid may be introduced into the hot well through the conduit 308 or the hot well may be drained. A float valve 311 is provided for regulating the flow of make-up water into the hot well.

Since contaminated make-up water may be included with the condensate drawn from the hot well by the pump 304, the water discharged by the pump is passed through a sterilizer 318. This sterilizer may be of any known construction such as a tubular heat exchanger type including tubes through which the water passes and a steam jacket surrounding the tubes. From the sterilizer 318 the heated water is directed through a conduit 320 to a tank 322 having internal baffles so that the flow of water therethrough is retarded to increase the time period during which the heated water remains at the sterilizing temperature. The sterilized water is directed from the holding tank 322 through a conduit 324 having a shutoff valve 326 therein to a cooling water circulating supply tank 328. The level of the water in this tank is controlled by a float valve 330, which valve is electrically connected with the pump motor 306 by wires 332 and 334 and thereby serves to control starting and stopping or regulating of the motor and the feeding of water to the tank. The sterilized water is drawn from the tank 328 through a conduit 336 and into a centrifugal pump 338 from where it is discharged through a conduit 340 into a water cooler 342 of any known construction. The water is discharged from the cooler through a conduit 344 which is connected to the above described conduit 288 which directs the water to the manifold 286. Water from the manifold passes through the nozzle 290 into the cooling chamber and is continuously drained from the cooling chamber through the conduit 292 and back into the supply tank 328.

It will be appreciated that the cooling water which comes into contact with the sterilized food in the cooling chamber will pick up minerals and vitamins and the like from the food. Therefore, it is often desirable that the cooling water or a portion thereof be used to provide the brine filling the can or other container in which the food is ultimately packaged. This may be accomplished by connecting the conduit 344 through a shutoff valve 346 with a conduit 348 which, in turn, is connected with a dispensing device 350 as shown in Fig. 2. The dispensing device has a nozzle 352 which projects within the housing 248 to discharge the brine into the cans 48. The brine supplied in this manner will be cold, and if it is desired to package the food in a hot brine, water from the pump 338 is by-passed around the cooler through conduit means 354 connected between the conduits 340 and 348. Conduit means 354 is provided with a shutoff valve 356.

In order to provide a sterile gas under pressure to the conduit 294 and the cooling chamber for the purposes described above, a compressor 358 is connected by a conduit 360 with a supply, not shown, of suitable gas such as air, nitrogen or flue gas. The gas is discharged from the compressor through a conduit 362 and into a pressure storage tank 364 from where it is directed by a conduit 366 into a gas superheater and sterilizer 368. From the sterilizer the gas is conveyed by conduits 370, 372 and 374 to the conduit 294. The gas entering the cooling chamber not only fills the chamber but the container-like links of the chain so that portions of the gas pass through the discharge end of the cooling chamber with each of the links to provide a sterile atmosphere in the housing 284. If necessary, additional means, not shown, may be provided for supplying sterile gas to the housing 284.

In accordance with one embodiment of the present invention, the means 36 at the loading station 34 is constructed so as to load predetermined measured quantities of the food to be processed into successive container-like links as the links pass the loading station. The loading means which is shown in Figs. 1 through 4 includes a hopper trough 376 mounted by suitable bracket means and adapted to contain a supply of food to be processed. The hopper is also adapted to contain a supply of water or brine to support a product such as peas and prevent damage thereto. A shaft 378 is rotatably supported above the trough by a pedestal 380. A spider having a plurality of arms 382 is fixed on the shaft 378 for rotation therewith, and each of the arms 382 has a stub shaft 384 mounted on its outer end. A bucket or dipper 386 is pivotally supported by each of the shafts 384 so that upon rotation of the spider, the buckets successively dip into the supply of food material in the hopper 376 and pick up a quantity of the food. In order to position the buckets for scooping into the hopper, an arm 388 is secured to each shaft, which arms are engageable with a cam member 390 supported by suitable bracket means, not shown, in the position shown best in Fig. 3 so that as the buckets move downwardly toward the hopper, the cam and the arms cooperate to tip the buckets. After the buckets have picked up a load of food and have been raised above the hopper, they are tipped and vibrated by means of a suitably supported interrupted cam member 392 which is engageable with the arms 388 so that their load of food is discharged into a chute 394. The chute 394 directs the food into successive container-like links passing therebeneath. It will be appreciated that the container-like links approach the loading station with their covers open. After the links have ben loaded and before they enter the tube 210 their covers are cammed shut by a suitably supported member 396.

In accordance with one feature of the present invention the loading mechanism is constructed so that predetermined measured quantities of the food to be processed are deposited in each of the container-like links whereby the subsequently processed food may be discharged directly into cans or other suitable containers in which the food is to be packaged. Thus, rotation of the spider is timed with respect to the movement of the container-like links so that the food picked up by each of the buckets is loaded into successive links. This is accomplished by driving the spider shaft 378 from the drive shaft 76 through a chain 398 which is wrapped around sprockets 400 and 402 fixed on the shafts 76 and 378, respectively. In addition, means is provided for insuring that each bucket carries a predetermined measured quantity of the food to the dumping position. This means includes a toothed cam member 404 adjustably mounted by suitable bracket means, not shown, for engagement with the arms 388 on the bucket shafts. As the filled buckets rise from the hopper, the ends of the arms 388 engage the teeth of the cam member 404 so that the buckets are vibrated and controllably tipped whereby any excess food carried thereby is dumped back into the hopper. The cam member 404 is provided with radially extending slots 406 for receiving mounting screws whereby the cam member may be adjusted radially with respect to the circular path of movement of the buckets. Thus, the cam member 404 may be adjusted so that the buckets are tilted different amounts so that the measured quantity of food carried thereby to the dumping position may be changed.

In operation the conveyor chain and loading means are preferably continuously driven by an electric motor 408 which is operatively connected with a sprocket 410 on the shaft 76 by means of a speed reducing unit 412 and a chain 414 which is wrapped around the sprocket 410 and an output sprocket of the speed reducing unit. The conveyor sprocket wheel 72 is driven from the shaft 76 by means of a chain 413 which extends around a sprocket 415 on the shaft 76 and a sprocket 417 fixed to the dish 108. Thus, the container-like links of the chain are continuously moved past the loading station and then through the various processing chambers or sections of the apparatus and finally to the unloading station. It should be noted that since the upper and lower courses of the chain pass through the fixed sealing tubes 238, 270 and 274, it is necessary that the upper and lower courses move along paths of travel disposed in fixed planes so that the piston ends of the chain links are in axial alignment with the sealing tubes.

Figures 8, 9, 10:
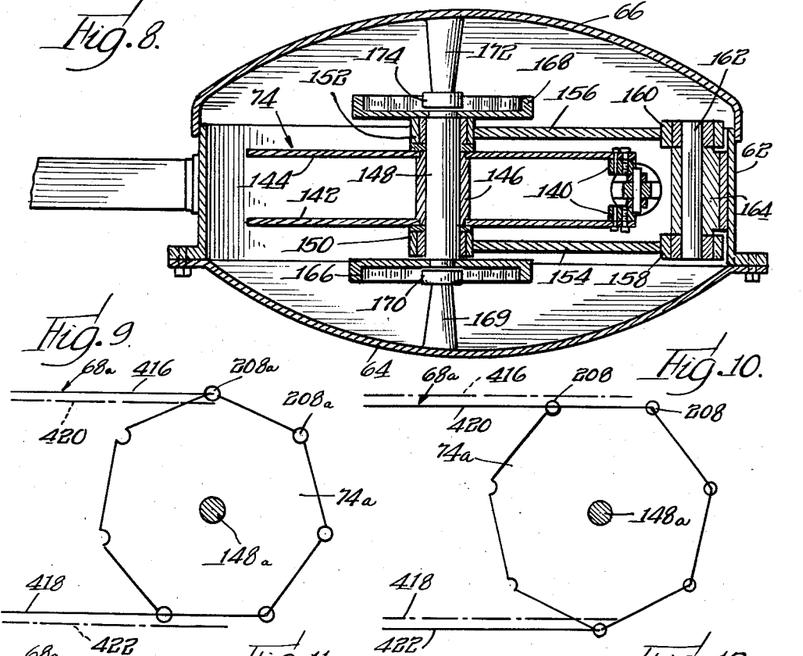
Fig. 8 is an enlarged sectional view taken along line 8—8 in Fig. 2.
Figs. 9 through 12 are diagrammatic views illustrating the manner in which a portion of the apparatus operates.
Figure 11:
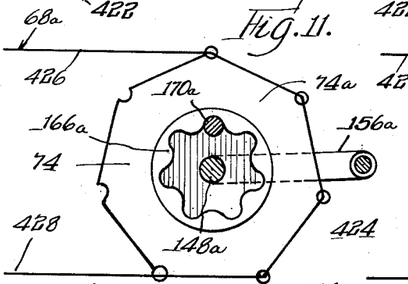

In order better to explain the problem maintaining the conveyor chain courses in predetermined fixed paths of travel, or in other words, the problem of eliminating wobble of the chain due to the sprocket wheel action and the manner in which this problem has been solved by the present invention, reference is made to Figs. 9 through 11. In Figs. 9 and 10, there is diagrammatically shown a sprocket wheel 74a which corresponds to the above described sprocket wheel 74 except that it has a lesser number of teeth or chain engaging notches in order to provide a clearer illustration of the problem involved. In these figures, the sprocket wheel 74a is supported in the conventional manner on a shaft 148a which has a fixed center of rotation. When the sprocket wheel 74a is in the position shown in Fig. 9, it is seen that the upper course of the chain 68a extends along a path indicated by the line 416 and the lower course of the chain extends along a path indicated by the line 418. However, when the sprocket wheel has rotated to the position shown in Fig. 10, the upper course of the chain has been shifted so that it extends along a path indicated by the line 420 and the lower course of the chain has similarly been shifted so that it extends along a path indicated by the line 422. This shifting of the paths of the upper and lower courses occurs very rapidly so that the chain is vibrated or shaken, and any attempt to pass such a vibrating chain through fixed sealing tubes or cylinders of the type described above would result in undue wear of the sealing tubes and the links and the provision of an unsatisfactory seal. However, in accordance with the present invention, such vibrating or shaking of the chain has been eliminated by supporting the sprocket wheels in the manner described above and diagrammatically shown in Figs. 11 and 12.

Figure 12:
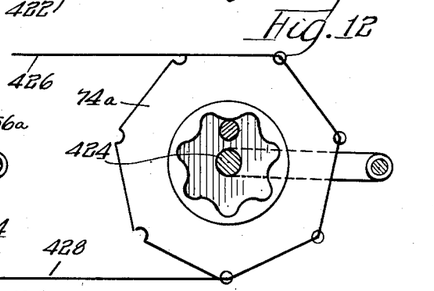
Figure 13:
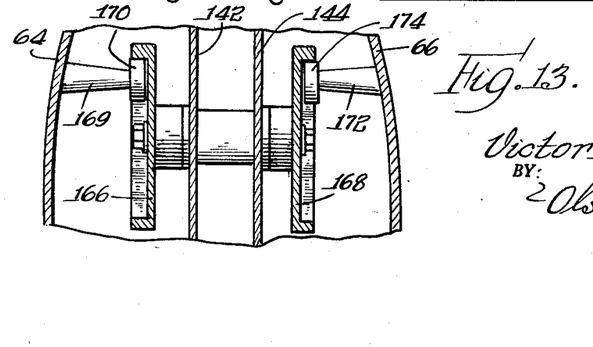
Fig. 13 is an enlarged fragmentary cross sectional view taken along line 13—13 in Fig. 7.
Figures 14, 15:
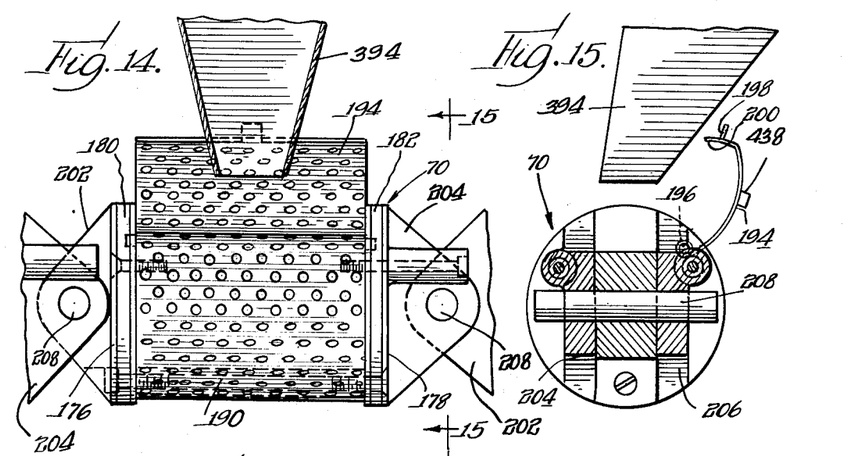
Fig. 14 is an enlarged fragmentary elevational view of a portion of the food product conveyor disposed at a filling station.
Fig. 15 is a cross sectional view taken along line 15—15 in Fig. 14.

Referring specifically to Figs. 11 and 12, it is seen that the sprocket wheel 74a is now mounted on a shaft 148a which is pivotally supported by arms 156a. The sprocket wheel is further supported by means of a cam roller 170a which engages a cam 166a mounted on the sprocket wheel. It should be noted that the cam 166a has a number of lobes which is equal to the number of teeth or chain engaging elements of the sprocket wheel. Furthermore, the lobes are positioned so that radial lines extending through their high points bisect the angles between the chain engaging teeth or elements. Thus, with the sprocket wheel in the position shown in Fig. 11 which corresponds to the position shown in Fig. 9, the cam follower rests in a valley of the cam, the center of rotation 424 of the sprocket wheel is in the position shown and the upper and lower courses of the chain extend along paths indicated by the lines 426 and 428. Now when the sprocket wheel is rotated to the position shown in Fig. 12 which corresponds to the position shown in Fig. 10, the cam follower rides up on a lobe of the cam so that the center of rotation 424 of the sprocket wheel is raised. This causes the upper and lower courses of the chain to extend along substantially the same paths of travel 426 and 428. Thus, it is seen that the novel structure for mounting the sprocket wheels functions practically to eliminate vibrating or shaking of the conveyor chain and maintains it in alignment with the cylinders. It is important to note that the sprocket wheels must be provided with an odd number of teeth or chain engaging elements in order to obtain the results just described.

From the above description, it is seen that the filed container-like links pass smoothly into the tube 210 wherein contained air is driven from the goods carried by the links. Then the links succesively pass smoothly through the cylinder 238 and form therewith a continuous seal separating the purging and sterilizing chambers. As the links pass through the tubes 212 and 214 and around the sprocket wheel 74, the goods or food carried by the links is uniformly and rapidly heated to a predetermined temperature and held at approximately this temperature for a predetermined length of time set by the speed of the conveyor chain to effect thorough sterilization of all the goods or food being processed. It should be noted that as the container-like links pass around the sprocket wheel 74 they are inverted and as a result, the goods carried therein are gently shifted or tumbled so as to insure intimate contact of the steam with all particles of the goods or food without danger of mashing the food. In order to hold the covers of the container-like links closed as the links are inverted, a semi-circular guide member 430 is provided adjacent the path of travel of the links, which guide member is supported by the arms 154 and 156. In addition a pair of lugs 436 and 438 is mounted adjacent opposite ends of each of the covers, which lugs are engageable with the guide member 430 and cooperate with the guide member to maintain the covers closed.

As the container-like links leave the bottom of the sprocket wheel 74, they are directed smoothly through the sealing tube or cylinder 270 into the cooling chamber. In order to maintain the covers of the container-like links closed as they pass from the guide member 430 to the cylinder 270, a track 440 supported by one or more blocks 442 and 444 is provided. A similar elongated track member 446 supported by a plurality of blocks 448 is provided for holding the covers closed as the container-like links pass through the cooling chamber. As the container-like links pass through the cooling chamber the sterilized goods carried thereby are quickly cooled to a desired lower temperature by sprays of cooling water directed into the tube 264 through the nozzles 290. This cooling water is drained through the conduit 292 and recirculated in the manner described above.

In accordance with another feature of this invention the sterilized and cooled food may be discharged directly into cans or the like in which the food is to be packaged from the conveyor links. This may be readily accomplished since as the container-like links emerge from the sealing cylinder 274 at the discharge end of the cooling chamber, the covers of the links fall open by gravity and the contents of the container-like links are successively dropped into a funnel or chute 450. An endless conveyor 452 is enclosed in the sterile atmosphere within the housing means 248, which conveyor supports a series of cans 48 or other suitable containers for receiving the processed food from the funnel 450. The conveyor 452 may be driven by the motor 408 through suitable endless belt or gear drive means, not shown, so that it moves in predetermined timed relationship with respect to the container link conveyor whereby to successively position the cans beneath the funnel 450 for receiving food or goods discharged from successive container-like links. In addition, it will be appreciated that suitable control means for the brine dispensing mechanism 350 is provided so that brine is dispensed only when a can is disposed beneath the nozzle 352, and this control means which is not shown may be actuated by a feeler finger 454 positioned to extend into the path of travel of the cans and determine whether or not a can is properly positioned beneath the nozzle. After the cans have been filled they are conveyed through the aseptic atmosphere within the housing or tunnel means 248 to a can closing apparatus which is also enclosed in an aseptic atmosphere, as will be understood.

After the goods or food has been discharged from the container-like links into the chute or funnel 450, continued advancement of the links causes the open covers thereof to engage a cam plate 456 supported within the housing means 284, which cam plate forces the covers closed to permit the container-like links to pass through a restricted outlet opening in the housing. After the container-like links have emerged from the housing 284 the covers again drop to their open positions and they remain in the open positions while the links are advanced to and past the loading station.

Figures 20, 21, 22:
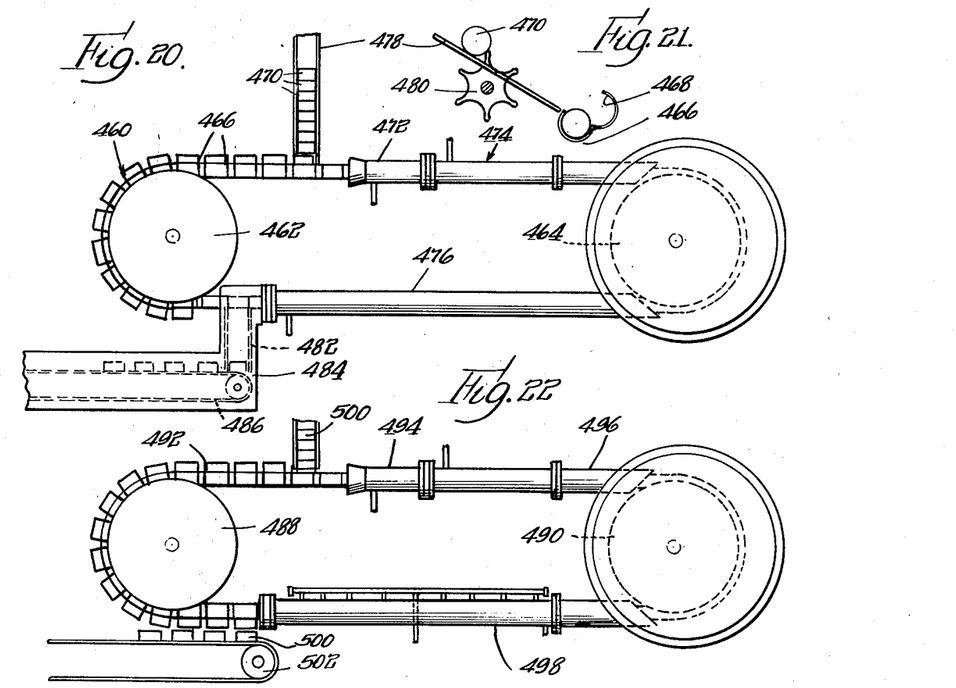
Fig. 20 illustrates a modified embodiment of the invention, particularly adapted for use with sterilized cans or containers.
Fig. 21 is a detail view of the feed mechanism of the embodiment of Fig. 20.
Fig. 22 shows a further modified embodiment of the invention, combining certain features of the embodiments previously described.

In Figs. 20 and 21 there is illustrated a slightly modified form of the present invention which is especially adapted for sterilizing cans or containers. In this embodiment the conveyor means 460 is substantially identical to the above described conveyor means 68 and, therefore, need not be set forth in detail. It suffices to state that the conveyor means 460 includes a pair of spaced sprocket wheel means 462 and 464 which are supported in the same manner as the sprocket wheels described above, and an endless chain of container-like links 466 which are substantially identical to the above described container-like links except that, if necessary, the covers 468 of the links may be wider than the covers described above in order to permit entry of cans 470 or the like into the links. In this embodiment the apparatus is provided with a purging section 472 and a sterilizing section 474 which are substantially identical to the above described corresponding sections. However, in this embodiment the sterilizing section may be extended by an elongated tube 476 since it is unnecessary to provide means for cooling the sterilized containers and since this enables the conveyor to be operated at a higher speed while still holding the containers in the sterilizing steam atmosphere for a sufficient period of time. It is, of course, understood that the sterilizing section 474 is provided with sealing tubes adjacent its opposite ends which are cooperable with piston end plates of the conveyor links continuously to seal the opposite ends of the steam chamber.

In the embodiment of Figs. 20 and 21 the above described loading mechanism has been replaced by a chute 478 adapted to hold a supply of containers 470 and a rotatable star wheel 480 which functions to release the containers one at a time for loading into the links of the conveyor. Essentially the same means described above may be provided for operating the conveyor and the star wheel in timed relationship. The sterilized containers are unloaded from the chain links onto a chute 482 which is enclosed within a housing or tunnel 484 having an aseptic atmosphere therein. The chute 482 may be formed to direct the sterilized containers to any desired point of discharge or onto a conveyor 486 also enclosed with the tunnel.

In Fig. 22 there is diagrammatically shown a structure which combines certain features of both of the above described embodiments. In this embodiment the conveyor which includes spaced sprocket wheel means 488 and 490 and an endless chain 492 of container-like links, and the purging section 494, the sterilizing section 496, and the cooling section 498 are substantially identical to the corresponding elements in sections of the apparatus shown in Figs. 1 and 2. This embodiment is especially adapted for processing food in previously filled cans 500. Therefore, the structure shown in Fig. 22 is provided with the loading mechanism shown in Fig. 21 and with a conveyor 502 for receiving processed cans directly from the link conveyor.

Figure 23:
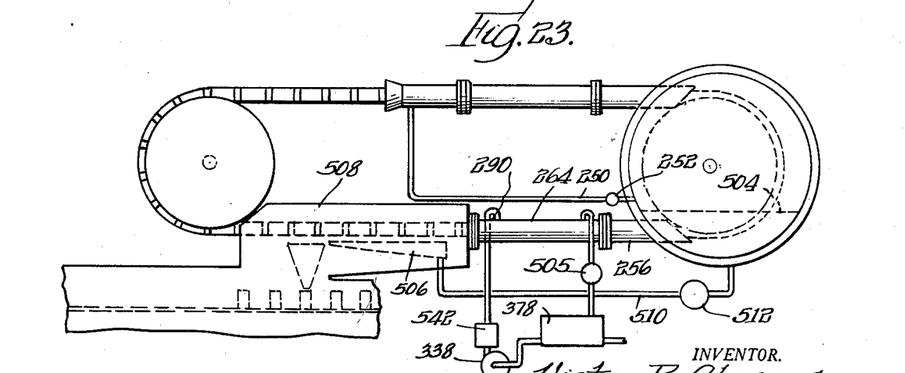
Fig. 23 illustrates another embodiment of the apparatus, generally similar to the embodiment of Figs. 1–19, but modified to change the manner of cooling the sterilized goods.

In Fig. 23 there is shown an apparatus which is substantially identical to the apparatus described above and shown in Figs. 1 through 19 as indicated by the application of identical reference numerals by corresponding elements. However, the apparatus shown in Fig. 23 has been modified slightly to change the manner of cooling the sterilized goods. As mentioned above, there is a tendency for the food particles impregnated with steam to explode as they are transferred from the steam chamber into the cooling chamber. This tendency is overcome in the apparatus described above by filling the cooling chamber with an inert gas under pressure to prevent the steam from expanding. While this procedure is satisfactory in many instances it does require the provision of considerable additional equipment and with some foods, it is desirable to avoid all contact with air even though the air is sterilized. These disadvantages are overcome in the embodiment of Fig. 23 by maintaining the lower portion of the housing surrounding the sprocket wheel 74 filled with condensate to a level indicated by the line 504. As will be understood, this condensate is at substantially the same temperature and pressure as the steam within the chamber. It should be noted that the level 504 of the condensate is above the tube 256 so that as the container links pass around the sprocket wheel and into the tube, they are completely filled with the condensate or water. The apparatus for circulating cooling water has been modified slightly by eliminating the plurality of nozzles and the manifold and providing only a single nozzle 290 adjacent the discharge end of the tube 264 forming the cooling chamber, and the pump 338 is operated so as to maintain the tube 264 completely filled with cooling water at a pressure equal to or in excess of the steam pressure at 504. Pump 338 supplies pressure which is controlled by back pressure valve 505 circulating in a direction opposite to the direction of movement of the conveyor chain. Thus, as the container-like links which are filled with condensate rather than steam enter the cooling chamber, the condensate is mixed with and displaced by the cooling water so that the food is effectively cooled without danger of injury thereto. It will be appreciated that as the container-like links emerge from the cooling chamber water will be carried therewith through the sealing means, which water then drains from the links and is collected in a trough 506 disposed within housing or tunnel means 508 which corresponds to the above described housing means 248. This water is then drawn through a conduit 510 by a pump 512 and forced back into the chamber surrounding the sprocket wheel 74. Since the volume of water carried by the chain links from the chamber surrounding the sprocket wheel is substantially the same as the volume of water carried by the links out of the cooling chamber and drained into the trough 506, it is seen that the level 504 of the water will remain substantially constant. However, some water may be lost due to leakage and evaporation, and make-up water may be supplied to the tank 328 by substantially the same means described above and shown in Fig. 7.

From the above description it is seen that the present invention has provided a novel apparatus whereby goods such as solid foods or containers and the like may be continuously introduced into a chamber containing wet steam under pressure so that they may be rapidly and effectively sterilized and then cooled, if desired, without danger of injury thereto. It is also seen that the present invention has provided a novel apparatus whereby solid foods may be continuously sterilized in predetermined measured increments and then discharged directly into containers disposed in an aseptic atmosphere in a relatively rapid and economical manner and without danger of mashing or crushing the food. Furthermore, it is seen that the present invention has provided a novel conveyor structure which is formed so that the courses thereof always move along fixed paths of travel without vibrating or shaking.

While the preferred embodiments of the present invention have been shown and described herein it is obvious that many structural details may be changed without departing from the spirit and scope of the appended claims. For example, larger container links may be used, each capable of holding a quantity of material adequate for a plurality of cans or packages and then the processed material may be packaged by means of conventional filling and handling means, or the container links may be sub-divided so that each compartment holds a preproportioned quantity for each can and then each compartment may be loaded into individual containers.

The invention is claimed as follows:

1. A processing apparatus comprising conveyor means including a series of connected link means having container means for holding goods to be processed and providing an endless chain, a pair of rotatably mounted spaced sprocket means supporting said chain, elongated processing chamber means greater in internal transverse dimensions than said link means and enclosing a portion of said chain between said sprocket means and having an inlet opening and an outlet opening, means which is relatively short as compared with said chamber means defining and restricting one of said openings and cooperable with said link means for continuously substantially sealing said one opening, and means for shifting centers of rotation of said sprocket means in a direction extending transversely of said one opening and said portion of the chain for maintaining said portion of the chain substantially in axial alignment with said one opening.

2. A processing apparatus comprising conveyor means including a series of connected link means for holding goods to be processed and providing an endless chain, a pair of rotatably mounted spaced sprocket means supporting said chain, processing chamber means enclosing a portion of said chain disposed between said sprocket means and having an opening through which said chain passes, means defining said opening and co-operable with each of said link means for continuously substantially sealing said opening, and means for shifting centers of rotation of said sprocket means in a direction extending transversely of said opening and said portion of the chain to maintain said chain portion in alignment with said opening.

3. A processing apparatus comprising conveyor means including a series of connected link means for holding goods to be processed and providing an endless chain, a pair of rotatably mounted spaced apart sprocket means supporting said endless chain, processing chamber means enclosing a portion of said chain between said sprocket means and having inlet and outlet openings for said chain, means defining said inlet and outlet openings and co-operable with each of said link means for continuously substantially sealing said openings, and means for shifting centers of rotation of said sprocket means in a direction extending transversely of said openings and said chain portions to maintain said chain portion in alignment with said inlet and outlet openings.

4. A processing apparatus comprising conveyor means including a series of connected link means for holding goods to be processed and providing an endless chain, and a pair of rotatably mounted spaced sprocket means supporting said endless chain, processing chamber means enclosing a portion of said chain and having an inlet opening for one reach of the chain and an outlet opening for another reach of the chain, means defining said inlet and outlet openings and co-operable with each of said link means for continuously substantially sealing said openings, and means for shifting centers of rotation of said sprocket means back and forth in a direction extending transversely of said chain reaches continuously to maintain said chain reaches substantially in axial alignment with their associated openings.

5. A processing apparatus comprising conveyor means including a series of connected link means having container means for holding goods to be processed and providing an endless chain, and a pair of rotatably mounted spaced sprocket means supporting said endless chain, processing chamber means loosely enclosing a relatively long portion of said chain and having internal transverse dimensions substantially greater than said link means and having an inlet opening for one reach of the chain and an outlet opening for another reach of the chain, means which is relatively short as compared with the length of the portion of said chain enclosed by said chamber means defining said inlet and outlet openings and co-operable with each of said link means for continuously substantially sealing said openings, each of said sprocket means having an odd number of peripherally spaced elements engageable with said chain, and means for shifting centers of rotation of said sprocket means back and forth in a direction extending transversely of said chain reaches continuously to maintain said chain reaches substantially in axial alignment with their associated openings.

6. A processing apparatus comprising conveyor means including a series of connected link means for holding goods to be processed and providing an endless chain, a pair of rotatably mounted spaced sprocket means supporting said endless chain, processing chamber means enclosing a portion of said chain and having an inlet opening and an outlet opening, means defining said inlet and outlet openings and co-operable with each of said link means for continuously substantially sealing said openings, means for shifting centers of rotation of said sprocket means in a direction extending transversely of said openings and said portion of the chain for maintaining said chain portion in alignment with said openings, said chamber means having a heating section and a cooling section, means connected with said heating section for introducing a heating fluid into said heating section, means connected with said cooling section for introducing a cooling fluid into said cooling section, and means between said sections and co-operable with each of said link means for continuously substantially sealing each of said sections from the other.

7. A processing apparatus comprising conveyor means including a series of connected link means having individual container means for holding goods to be processed and providing an endless chain, and a pair of rotatably mounted spaced sprocket means supporting said chain, processing chamber means having internal transverse dimensions substantially greater than said link means and loosely receiving said link means enclosing a portion of said chain and having an inlet opening and an outlet opening for the chain, restricted means defining said inlet opening and said outlet opening and co-operable with each of said link means for continuously substantially sealing said openings, at least one of said opening defining means encircling a reach of said chain between said pair of sprocket means, means for moving centers of rotation of said pair of sprocket means back and forth in a direction extending transversely of said one opening and said chain reach for maintaining portions of said chain reach substantially in axial alignment with said one opening, means adjacent said chain for successively loading a quantity of goods to be processed onto each of said link means, and means adjacent said chain for successively unloading processed goods from each of said link means.

8. A food processing apparatus comprising conveyor means including a series of connected container-like link means for receiving and retaining separate portions of a food product and providing an endless chain, and a pair of spaced rotatable sprocket means movably supporting said endless chain, processing chamber means enclosing a portion of said chain and having internal transverse dimensions substantially larger than said link means and having inlet and outlet openings for the chain, restricted means defining said inlet and outlet openings and co-operable with each of said container-like link means for continuously substantially sealing said openings, means adjacent said chain for loading a predetermined measured quantity of food to be processed successively into each of said container-like link means, and means for shifting centers of rotation of said sprocket means in a direction extending transversely of said openings and said portion of the chain for maintaining said chain portion in alignment with said openings.

9. A food processing apparatus comprising endless conveyor means including a series of connected container-like link means extending around a pair of horizontally spaced apart rotatable means and having upper and lower reaches extending between said pair of rotatable means, each of said container-like link means having a side opening which faces upwardly when the link means is in said upper reach and downwardly when said link means is in the lower reach, each of said link means including closure means selectively for covering and uncovering the side opening thereof, processing chamber means enclosing a portion of said link means, means adjacent said upper reach said conveyor means for successively loading a predetermined measured quantity of food to be processed into each of said container-like link means, means adjacent said lower reach said conveyor means for directing processed food successively from each of said container-like link means directly into containers in which the food is to be packaged, means for closing the closure means of successive link means as they leave said loading means and for accomplishing opening of the closure means of successive link means as they approach and are adjacent to said food directing means, and processing chamber means encircling portions of said upper and lower reaches between said loading means and said food directing means.

10. A processing apparatus comprising a conveyor including a movably mounted endless chain of links and a pair of spaced rotatable sprocket means supporting said chain, each of said links comprising a pair of spaced apart piston-like end plates and container means between said end plates for interconnecting the end plates and retaining goods to be processed, pivot means between adjacent end plates of adjacent links and pivotally connecting said adjacent links processing chamber means enclosing a portion of said links and having opening means therein through which said links pass, means defining said opening means and cooperable with said piston-like end plates for continuously substantially sealing said opening means, and means for shifting centers of rotation of said sprocket means in a direction extending transversely of said opening means and said portion of said links for maintaining said portion of said links in alignment with said opening means.

11. A processing apparatus comprising a conveyor including an endless chain of links, a pair of spaced apart rotatable sprocket means movably supporting said endless chain, each of said links comprising a pair of spaced apart piston-like end plates and elongated container means between said end plates for interconnecting the end plates and retaining goods to be processed, processing chamber means loosely enclosing a portion of said links and having internal transverse dimensions substantially greater than said links and having opening means through which said links pass, an elongated tube defining said opening means and successively snugly receiving said piston-like end plates for co-operating with the piston-like end plates substantially to seal said opening means, said tube having a length as great as the spacing between said piston-like end plates to insure continuous sealing of said opening means, and means for shifting centers of rotation of said sprocket means in a direction extending transversely of said opening means and said portion of said links for maintaining said portion of said links in alignment with said opening means.

12. A processing apparatus comprising a conveyor including a movably mounted endless chain of links, each of said links including perforated container means adapted to hold goods to be processed and a pair of piston means secured to opposite ends of the container means, said container means having a closure which may be opened for loading and unloading of the container means, processing chamber means enclosing a portion of said links and having opening means therein through which said links pass, and means defining said opening means and co-operable with each of said piston means for substantially sealing said opening means.

13. A processing apparatus comprising a movably mounted conveyor including an endless chain provided by a series of connected link means each for holding a container filled with goods to be processed and a pair of spaced rotatable sprocket means supporting said chain, processing chamber means having inlet and outlet openings for said endless chain and having internal transverse dimensions substantially greater than said links and loosely enclosing a portion of said endless chain, restricted means defining said inlet and outlet openings for engaging and cooperating with said link means for continuously substantially sealing said openings while said chain passes therethrough, said chamber means having a first section adapted to contain a heated processing fluid under pressure and a second section adapted to contain cooling fluid, restricted means between said sections for engaging and cooperating with said link means for continuously substantially sealing said sections from each other, means for successively loading containers filled with goods to be processed onto said link means, and means for shifting centers of rotation of said sprocket means in a direction extending transversely of said inlet and outlet openings and said portion of the chain for maintaining said chain portion in alignment with said openings.

References Cited in the file of this patent

UNITED STATES PATENTS

| | | |
|---|---|---|
| 515,150 | Lillibridge | Feb. 20, 1894 |
| 1,390,703 | Hansen | Sept. 13, 1921 |
| 1,417,182 | Landrum et al. | May 23, 1922 |
| 1,495,450 | Smith | May 27, 1924 |
| 1,570,235 | Fooks | Jan. 19, 1926 |
| 2,058,849 | Berger | Oct. 27, 1936 |
| 2,154,978 | Galvin | Apr. 18, 1939 |
| 2,239,690 | Ball | Apr. 29, 1941 |
| 2,303,422 | Ball | Dec. 1, 1942 |
| 2,403,871 | McBean | July 9, 1946 |
| 2,479,171 | Lamperti | Aug. 16, 1949 |
| 2,624,474 | Hapman | Jan. 6, 1953 |
| 2,698,078 | Harrison | Dec. 28, 1954 |

FOREIGN PATENTS

| | | |
|---|---|---|
| 1,052,000 | France | Sept. 23, 1953 |